(12) United States Patent
Tomohara et al.

(10) Patent No.: US 8,102,092 B2
(45) Date of Patent: Jan. 24, 2012

(54) SPLIT CORES FOR MOTOR STATOR, MOTOR STATOR, PERMANENT MAGNET TYPE SYNCHRONOUS MOTOR AND PUNCHING METHOD BY SPLIT CORE PUNCHING DIE

(75) Inventors: Kenji Tomohara, Kitakyushu (JP); Seiji Miyazaki, Kitakyushu (JP); Mitsuhiro Koga, Kitakyushu (JP); Makoto Matsumoto, Kitakyushu (JP); Hiroshi Koga, Kitakyushu (JP); Shinichi Sakamoto, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 395 days.

(21) Appl. No.: 12/161,931

(22) PCT Filed: Jan. 19, 2007

(86) PCT No.: PCT/JP2007/050749
§ 371 (c)(1),
(2), (4) Date: Jul. 23, 2008

(87) PCT Pub. No.: WO2007/086312
PCT Pub. Date: Aug. 2, 2007

(65) Prior Publication Data
US 2009/0026872 A1    Jan. 29, 2009

(30) Foreign Application Priority Data
Jan. 24, 2006 (JP) .................... 2006-015223

(51) Int. Cl.
*H02K 1/06* (2006.01)

(52) U.S. Cl. .................................. 310/216.008
(58) Field of Classification Search .................. 310/216.001–216.137
See application file for complete search history.

(56) References Cited

U.S. PATENT DOCUMENTS

| | | | |
|---|---|---|---|
| 4,616,151 A | 10/1986 | Pryjmak | |
| 5,266,859 A | 11/1993 | Stanley | |
| 5,583,387 A | 12/1996 | Takeuchi et al. | |
| 5,969,454 A | 10/1999 | Pengov et al. | |
| 6,226,856 B1 | 5/2001 | Kazama et al. | |
| 6,952,064 B2 * | 10/2005 | Hiwaki et al. | 310/214 |
| 7,595,578 B2 * | 9/2009 | Aramaki et al. | 29/603.01 |

FOREIGN PATENT DOCUMENTS

| | | |
|---|---|---|
| EP | 0823771 A1 | 2/1998 |
| EP | 1052761 A2 | 11/2000 |
| FR | 2811155 A1 | 1/2002 |

(Continued)

OTHER PUBLICATIONS

German Office Action dated Sep. 11, 2009.

(Continued)

*Primary Examiner* — Nguyen N Hanh
(74) *Attorney, Agent, or Firm* — Sughrue Mion, PLLC

(57) ABSTRACT

Split cores comprising laminated iron cores each having formed thereon a tooth, and a yoke and a pole piece which are connected to the tooth at both ends thereof, and arranged and connected together into an annular shape to make a stator. Both ends of the yokes and both ends of the pole pieces are displaced in one circumferential direction by laminated iron core from a top laminated layer of the iron cores of the split cores to a bottom laminated layer of the iron cores or split cores.

4 Claims, 16 Drawing Sheets

FOREIGN PATENT DOCUMENTS

| | | | |
|---|---|---|---|
| GB | 2389241 A | 12/2003 |
| JP | 57180339 A | 11/1982 |
| JP | 57183251 A | 11/1982 |
| JP | 61092134 A | 5/1986 |
| JP | 01270757 A | 10/1989 |
| JP | 02254954 A | 10/1990 |
| JP | 3-78447 A | 4/1991 |
| JP | 11-346447 A | 12/1999 |
| JP | 2001-119869 A | 4/2001 |
| JP | 2003-61319 | * | 8/2001 |
| JP | 2002-136003 A | 5/2002 |
| JP | 2002-369470 A | 12/2002 |
| JP | 2003-18802 A | 1/2003 |
| JP | 2003-70189 A | 3/2003 |
| JP | 3599066 B2 | 9/2004 |
| JP | 2005-168223 A | 6/2005 |
| JP | 2005-312207 A | 11/2005 |
| WO | 01/80401 A1 | 10/2001 |
| WO | 02/089301 A1 | 11/2002 |
| WO | WO 2006/120975 | * | 11/2006 |

OTHER PUBLICATIONS

Japanese Office Action issued on Oct. 25, 2011 in the corresponding Japanese Patent Application No. 2011-15030.

* cited by examiner

US 8,102,092 B2

SPLIT CORES FOR MOTOR STATOR, MOTOR STATOR, PERMANENT MAGNET TYPE SYNCHRONOUS MOTOR AND PUNCHING METHOD BY SPLIT CORE PUNCHING DIE

TECHNICAL FIELD

The present invention relates to a permanent magnet type synchronous motor which is required to operate smoothly in the field of FA such as machining tools and more particularly to split cores for a motor stator, the motor stator, and a punching method by a split core punching die.

BACKGROUND ART

In a conventional motor, a permanent magnet of a rotor is divided in an axial direction to constitute blocks, and the blocks are arranged while being displaced in a circumferential direction so that a skew effect is imparted to the motor. Since the blocks are arranged so as to have axial spaces therebetween, no leakage of magnetic flux is generated in an axial component, and hence, a magnetic flux distribution in a circumferential direction becomes a sine wave, whereby a cogging torque in each block is reduced (for example, Patent Document No. 1).

In addition, skew slots for displacing a stator continuously in a circumferential direction are widely known, and since the phase of cogging torque changes continuously, a summed total cogging torque is reduced.

FIG. 20 is a front view of a rotor of a conventional motor, and FIG. 21 is a side view of the same motor. In FIG. 20, a plurality of permanent magnets 2A are arranged in a circumferential direction on an outer circumference of a rotor 1, and as is shown in FIG. 21, a plurality of permanent magnets 2B are arranged spaced apart from the permanent magnets 2A in an axial direction while being shifted slightly in the circumferential direction as they extend in the axial direction, so as to provide a skew effect. In addition, by providing a gap G2, which is larger than a gap G1 between an S pole and an N pole of the permanent magnets, between the permanent magnets 2A and the permanents magnets 2B, a circumferential magnetic flux distribution of the rotor can be made to be a sine wave.

In this way, in the conventional permanent magnet type synchronous motor, since the permanent magnets of the rotor are displaced in the circumferential direction and the stator core is displaced in the circumferential direction, the cogging torque is reduced.

Patent Document No. 1: Japanese Patent No. 3599066 (page 4, FIGS. 3 and 4).

In addition, FIG. 22 shows a conventional laminated core with no skew provided on a stator core. In the figure, 30 denotes a stator core main body, 33A an initial punched core, 33B a final punched core, 35 a yoke, 35a a yoke fitting portion, 35b a V clamp, 36 a center yoke (a tooth), and 39 a pole piece. Since the shapes of pole pieces 39 of the initial punched core 33A and the final punched core 33B are completely the same, distal ends of the pole pieces 39 of the stator core main body 30 which is made up by laminating a number of stator cores are formed at right angles, and no skew is formed.

In this case, to eliminate cogging, as has been described in FIGS. 20 and 21, the rotor needs to be skewed in place of the stator, and to make this happen, the magnets are laminated together while being shifted from one another.

In this way, in the conventional method, while the following (1) and (2) have been performed, each has its own defect.

(1) In the event that a skew cannot be given to the stator, the magnets need to be shifted in a radial direction on the rotor side so that a skew is given to the rotor, and this work has been complicated.

(2) In addition, in the event that a smooth skew is given to the stator core, a cutting blade has to be prepared for each type of skew given, which has been difficult from the viewpoint of die size and limited production costs.

DISCLOSURE OF THE INVENTION

Problems to be Solved by the Invention

As has been described above, in the conventional permanent magnet type synchronous motor, the permanent magnets of the rotor are divided axially so as to constitute the blocks, and the blocks are arranged in such a manner as to be displaced in the circumferential direction so as to provide the skew effect. Since the respective blocks are spaced apart from each other in the axial direction, the leakage of magnetic flux is not generated in the axial component, and the magnetic flux distribution in the circumferential direction becomes the sine wave, whereby the cogging torque in each block is reduced on the whole. However, since the space between the blocks does not contribute to the generation of electromagnetic force, there has been caused a problem that the output of the motor is reduced.

On the contrary, in the event that there is provided no space between the blocks, since the skew effect cannot be exhibited sufficiently, the effect of reduced cogging becomes small, this having caused a problem that the reduction in cogging and the output of the motor are in a trade-off relationship.

In addition, since the skew slots which displace the stator core continuously in the circumferential have a slot cross section having a twisted shape, the winding operation of windings cannot be automated, this having caused a problem that a resulting motor becomes expensive, and moreover, since the regular winding becomes difficult and the actual slot area is reduced, the motor resistance is increased, and this has caused a problem that the reduction in efficiency is called for.

A first invention of this patent application has been made in view of the problems, and an object thereof is to provide a split core for a motor stator which can reduce cogging torque by the construction of a stator core without displacing blocks of a rotor of a permanent magnet type synchronous motor and without twisting the cross section of a slot.

In order to obtain split cores which can give a smooth skew to a stator core, a second invention of this patent application has a second object to provide a split core punching method by a die which does not require cutting blades to be prepared particularly for types of skews given, which is less restricted with respect to die size and which requires less production costs.

Means for Solving the Problems

With a view to solving the problem, according to one aspect of the invention, there is provided split cores including:

laminated iron cores each having formed thereon a tooth, and a yoke and a pole piece which are made to connect to the tooth at both ends thereof, and arranged and connected together into an annular shape to make up a stator, wherein both ends of the yokes and both ends of the pole pieces are displaced in one circumferential direction by laminated iron core from a top laminated layer of the iron cores of the split cores to a bottom laminated layer of the iron cores of the split cores.

According to one aspect of the invention, there is provided split cores including:

laminated iron cores each having formed thereon a tooth, and a yoke and a pole piece which are made to connect to the tooth at both ends thereof, and arranged and connected together into an annular shape to make up a stator, wherein both ends of the yokes and both ends of the pole pieces are displaced in one circumferential direction by laminated iron core from a top laminated layer of the iron cores of the split cores to a center laminated layer of the iron cores of the split cores, and are displaced in an opposite circumferential direction by laminated iron core from the center laminated layer of the iron cores of the split cores to a bottom laminated layer of the iron cores of the split cores.

According to one aspect of the invention, there is provided split cores including:

laminated iron cores each having formed thereon a tooth, and a yoke and a pole piece which are made to connect to the tooth at both ends thereof, and arranged and connected together into an annular shape to make up a stator, wherein both ends of the pole pieces are displaced in one circumferential direction by laminated iron core from a top laminated layer of the iron cores of the split cores to a bottom laminated layer of the iron cores of the split cores.

According to one aspect of the invention, there is provided split cores including:

laminated iron cores each having formed thereon a tooth, and a yoke and a pole piece which are made to connect to the tooth at both ends thereof, and arranged and connected together into an annular shape to make up a stator, wherein both ends of the pole pieces are displaced in one circumferential direction by laminated iron core from a top laminated layer of the iron cores of the split cores to a center laminated layer of the iron cores of the split cores, and are displaced in an opposite circumferential direction by laminated iron core from the center laminated layer of the iron cores of the split cores to a bottom laminated layer of the iron cores of the split cores.

According to one aspect of the invention, there is provided split cores, wherein in each of a plurality of blocks into which the split cores are divided in a laminated direction of laminated iron cores, neither ends of the yokes nor ends of the pole pieces are displaced in one circumferential direction along the laminated direction, and both ends of the yokes and both ends of the pole pieces of the respective blocks are displaced in one circumferential direction from an upper layer block to a lower layer block.

According to one aspect of the invention, there is provided split cores, wherein in each of a plurality of blocks into which the split cores are divided in a laminated direction of laminated iron cores, neither ends of the yokes nor ends of the pole pieces are displaced in one circumferential direction along the laminated direction, and both ends of the yokes and both ends of the pole pieces of consecutive blocks are displaced in one circumferential direction from an upper layer block to a center block, and are displaced in an opposite circumferential direction from the center block to a lower layer block.

According to one aspect of the invention, there is provided split cores, wherein in each of a plurality of blocks into which the split cores are divided in a laminated direction of laminated iron cores, neither ends of the yokes nor ends of the pole pieces are displaced in one circumferential direction along the laminated direction, and both ends of the yokes and both ends of the pole pieces of consecutive blocks are displaced in one circumferential direction from an upper layer block to a consecutive block, and are displaced in an opposite circumferential direction from the consecutive block to a lower consecutive block, this being repeated in a plurality of times.

According to one aspect of the invention, there is provided split cores, wherein the tooth has a constant width in circumference, and is not displaced in one circumferential direction from the top laminated layer of the iron cores of the split cores to the bottom laminated layer of the iron cores of the split cores.

According to one aspect of the invention, there is provided a motor stator including: the split core, pairs of insulators which are mounted on the split cores from both sides thereof in the laminated direction, and armature coils mounted on the teeth of the split cores via the insulators, wherein a plurality of split cores are arranged and connected with each other into an annular shape.

According to one aspect of the invention, there is provided a permanent magnet type synchronous motor including: a rotor disposed with a magnetic space interposed between the stator core and itself and having a plurality of permanent magnets disposed on a surface thereof.

According to one aspect of the invention, there is provided a punching method by a split core punching die, including the step of:

punching performed by changing a length of a distal end of a split core every stroke in the split core punching die.

Advantage of the Invention

By the configurations described above, since the ends of the yokes and the pole pieces at both ends of the teeth are displaced in the one circumferential direction by laminated iron core, the cogging torque is made equal and the rigidity of the cores when they are connected together is increased, and because of this, the assembling accuracy is improved and hence, cogging torque attributed to accuracy can be reduced, whereby smooth rotation can be obtained.

In addition, since the circumferential displacement of the iron cores is increased by displacing the iron cores of the split cores in the one direction towards the center laminated layer thereof and then displacing the iron cores of the split cores in the opposite direction from the center laminated layer thereof, the rigidity is increased further so as to reduce the cogging torque. In particular, a large advantage is provided for a long motor in which a large number of cores are laminated.

Since the cogging torque is reduced in the way described above while the teeth are not displaced, the winding operation of windings can be simplified.

Furthermore, since the productivity in punching out cores can be increased and the cores are grouped into the plurality of blocks, the productivity can be increased further.

In addition, by the punching method by the die of the invention, since the length of the tooth portions can be changed minutely by a rotary cutting blade built in a progressive die, a smooth skew can simply be obtained.

Figure 1:
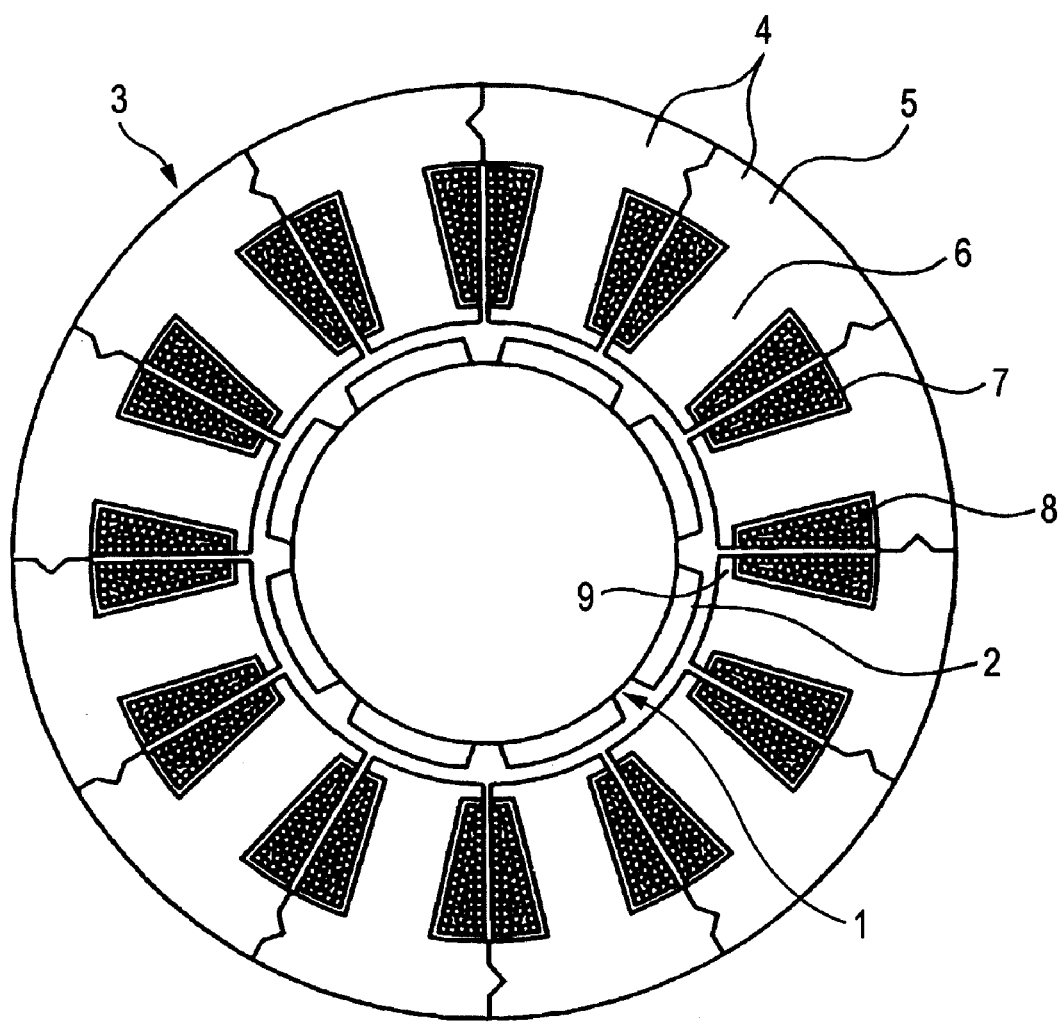
FIG. 1 is a sectional view showing a permanent magnet type synchronous motor which is an object to which the invention of the present patent application is applied.

DESCRIPTION OF REFERENCE NUMERALS 1 rotor; 2 permanent magnet; 3 stator; 4 split core; 5 yoke; 6 tooth; 7 insulator; 8 armature coil; 10 core A; 11 core B; 12a, 12b punch; 14 punch; 15 stripper; 16 die; 17 die sleeve; 18 bearing; 19 guide post; 20 die holder; 21 motor; 22 pulley; 23 timing belt; 24 rotary cutting blade; 25 material feeding direction; 26 punch-out unit; 27 drive unit; 30 stator core main body; 35 yoke; 35a yoke fitting portion; 35bV clamp; 36 center yoke (tooth); 39 pole piece; 52 center yoke (tooth); 56,58 initial punched core; 57, 59 final punched core; 111 upper block; 112 center block; 113 lower block; 114 upper, lower block; 115 center block; 116 conventional cogging torque wave form; 117 cogging torque wave form of Embodiment 3; 118 cogging torque wave form of Embodiment 2

BEST MODE FOR CARRYING OUT THE INVENTION

Hereinafter, embodiments of the invention will be described by reference to the drawings.

FIG. 1 is a sectional view of a permanent magnet type synchronous motor.

In the figure, 1 denotes a rotor, 2 a permanent magnet, 3 a stator, 4 a split core, 5 a yoke, 6 a tooth (a center yoke), 7 an insulator; 8 an armature coil, and 9 a pole piece. This permanent magnet type synchronous motor is such that a plurality of permanent magnets 2 are affixed to a surface of a rotor 1, and high-performance magnets are used so that an energy product of the permanent magnets 2 becomes on the order of 40 M (mega) Oe (oersted). The stator 3 is such that a sheet of electromagnetic steel having a thickness of the order 0.3 to 0.5 mm is pressed by a punching die having the shape of the split core 4, the sheets so punched out are laminated in a longitudinal direction and the laminated sheets are connected to each other.

The shape of the split core 4 is made up of an arc-like yoke 5 which constitutes an outer circumference, a pole piece 9 which constitutes an inner circumference and a tooth 6 which connect both the yoke 5 and the pole piece 9 together. A pair of insulators 5 are mounted on the teeth 6 from both sides thereof in the laminated direction, and armature coils 6 are wound on the insulators 5 in a regular fashion.

Embodiment 1

Figure 2:
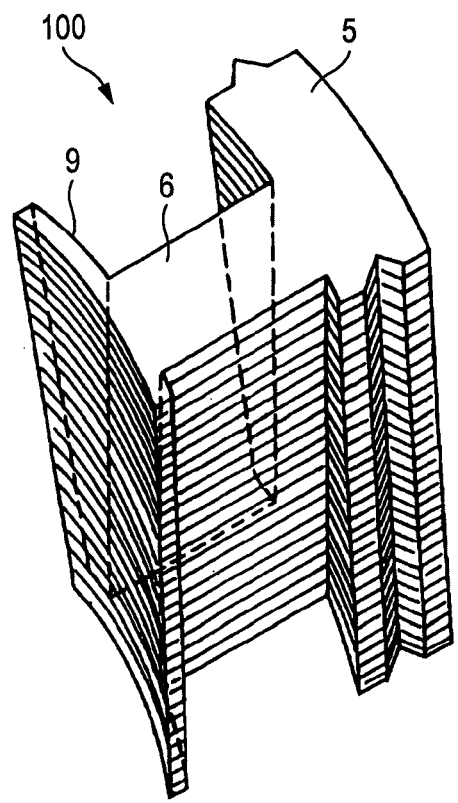
FIG. 2 is a perspective view showing a configuration formed by split cores of Embodiment 1 of the invention.
Figure 3:
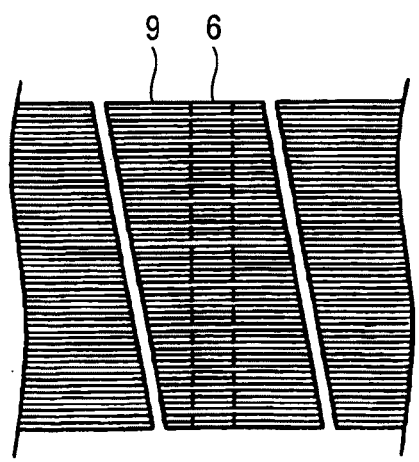
FIGS. 3(a) and 3(b) are sectioned side views of teeth and yokes when the split cores of Embodiment 1 are connected together.
Figure 3:
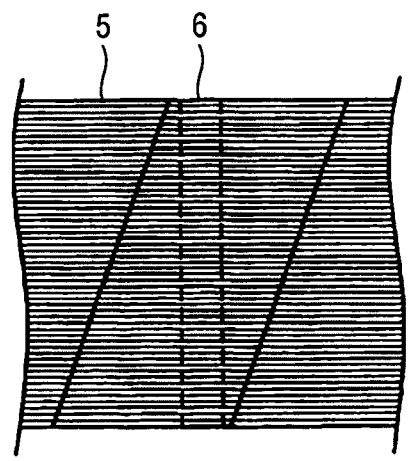

FIGS. 2 and 3 are diagrams which describe split cores according to Embodiment 1 of the invention, of which FIG. 2 is a perspective view and FIG. 3 shows sectioned side views of split cores of Embodiment 1 when they are connected together as viewed from the side of pole pieces (a) and the side of yokes (b), respectively. When a sheet of electromagnetic steel is punched out by the press, only both ends of a yoke and a pole piece at a distal end of a tooth are rotated in a circumferential direction by laminated iron core every time the sheet is punched out.

When a large number of split cores shown in FIG. 2 are laminated to form a stator laminated iron core 100, as is shown in FIGS. 3(a) and 3(b), since pole pieces 9 and yokes 5 are displaced in one circumferential direction, cogging torque is made equal, and since the rigidity of the split cores when they are connected together is increased, the assembling accuracy is improved, whereby cogging torque attributed to accuracy can be reduced, thereby making it possible to obtain smooth rotation.

Since only the ends of the pole pieces and the pole pieces at both ends of the teeth are rotated, the teeth are not twisted, and the winding work of windings can also be automated.

Embodiment 2

Figure 4:
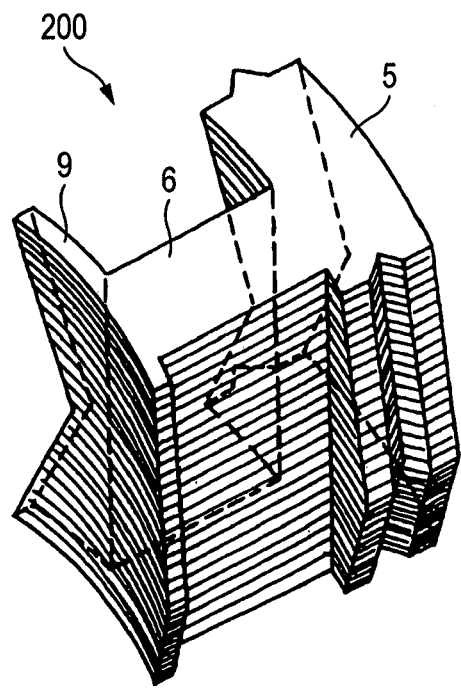
FIG. 4 is a perspective view showing a configuration formed by split cores of Embodiment 2 of the invention.
Figure 5:
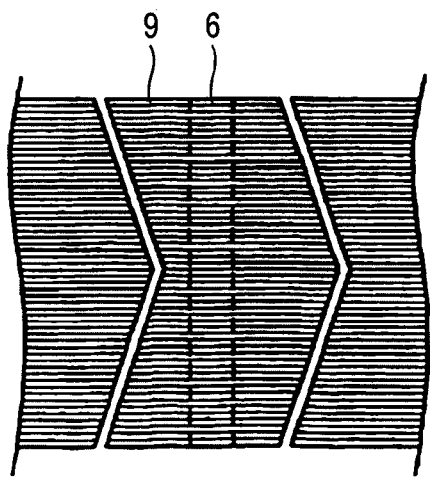
FIGS. 5(a) and 5(b) are sectioned side views of teeth and yokes when the split cores of Embodiment 2 are connected together.
Figure 5:
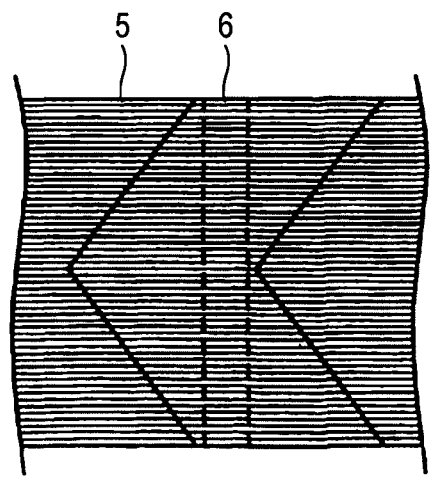

FIGS. 4 and 5 are diagrams which describe split cores according to Embodiment 2 of the invention, of which FIG. 4 is a perspective view and FIG. 5 shows sectioned side views of split cores of Embodiment 2 when they are connected together as viewed from the side of pole pieces (a) and the side of yokes (b), respectively. When a sheet of electromagnetic steel is punched out by the press, both ends of a yoke and a pole piece at a distal end of a tooth are rotated, by laminated iron core, in such a manner that the direction of displacement is changed at a central portion in a longitudinal direction when split cores so punched out are laminated.

When a large number of split cores shown in FIG. 4 are laminated to form a stator laminated iron core 200, as is shown in FIGS. 5(a) and 5(b), since pole pieces 9 and yokes 5 are displaced in one circumferential direction to a center laminated layer and are then displaced in an opposite direction downwards from the center laminated layer, cogging torque is made equal, and since the rigidity of the split cores when they are connected together is increased, the assembling accuracy is improved, whereby cogging torque attributed to accuracy can be reduced, thereby making it possible to obtain smooth rotation.

When the respective split cores are connected together, by increasing the displacement amount at the connecting portions, the rigidity is increased further so as to reduce the cogging torque.

Since only the ends of the pole pieces and the pole pieces at both ends of the teeth are rotated, the teeth are not twisted, and the winding work of windings can also be automated.

Embodiment 3

Figure 6:
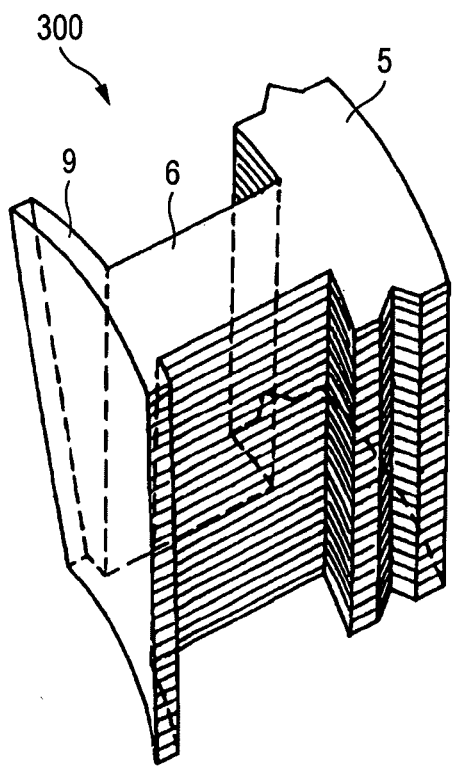
FIG. 6 is a perspective view showing a configuration formed by split cores of Embodiment 3 of the invention.
Figure 7:
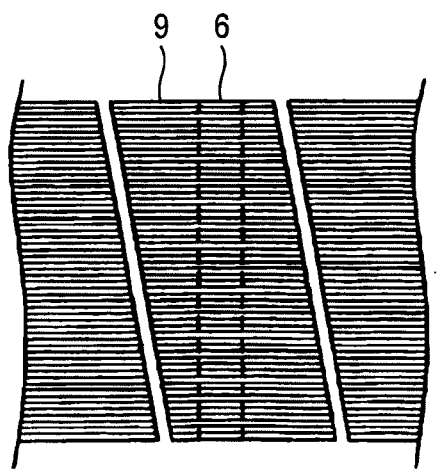
FIGS. 7(a) and 7(b) are sectioned side views of teeth and yokes when the split cores of Embodiment 3 are connected together.
Figure 7:
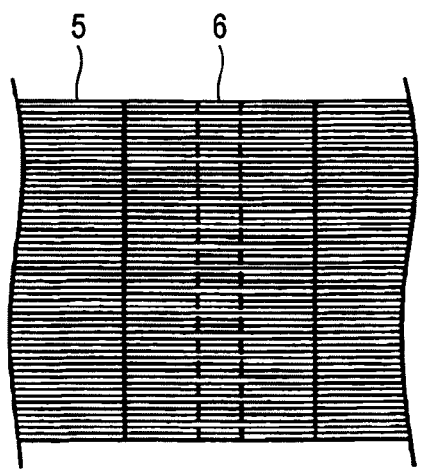

FIGS. 6 and 7 are diagrams which describe split cores according to Embodiment 3 of the invention, of which FIG. 6 is a perspective view and FIG. 7 shows sectioned side views of split cores of Embodiment 3 when they are connected together as viewed from the side of pole pieces (a) and the side of yokes (b), respectively. When a sheet of electromagnetic steel is punched out by the press, only a pole piece at both ends of the teeth is rotated in a circumferential direction by laminated iron core.

When a large number of split cores shown in FIG. 5 are laminated to form a stator laminated iron core 300, as is shown in FIGS. 7(a) and 7(b), since pole pieces are displaced in one circumferential direction, cogging torque is made equal, and teeth are not twisted but are in a straight line, thereby making it possible to make the winding work of windings simple and easy.

Embodiment 4

Figure 8:
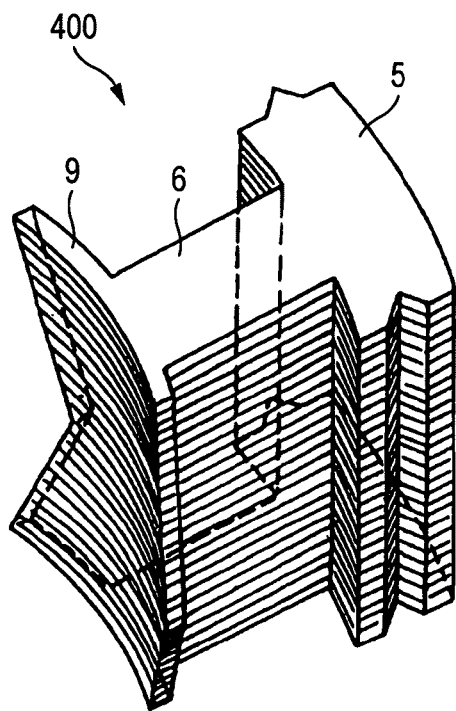
FIG. 8 is a perspective view showing a configuration formed by split cores of Embodiment 4 of the invention.
Figure 9:
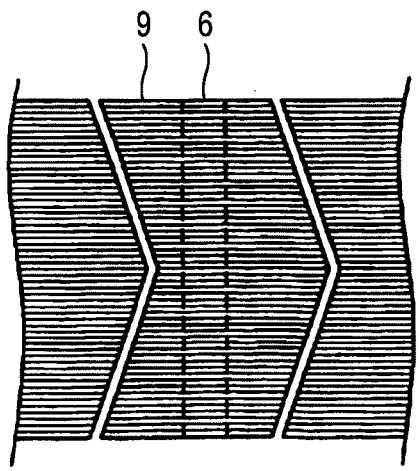
FIGS. 9(a) and 9(b) are sectioned side views of teeth and yokes when the split cores of Embodiment 4 are connected together.
Figure 9:
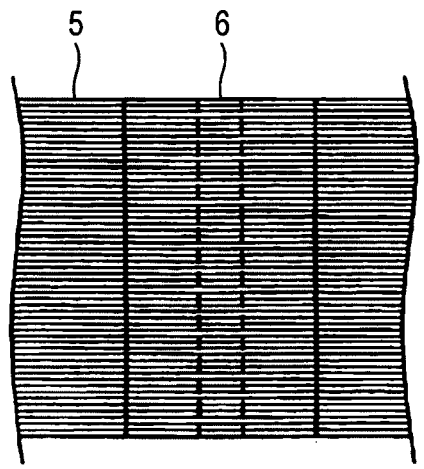

FIGS. 8 and 9 are diagrams which describe split cores according to Embodiment 4 of the invention, of which FIG. 8 is a perspective view and FIG. 9 shows sectioned side views of split cores of Embodiment 4 when they are connected together as viewed from the side of pole pieces (a) and the side of yokes (b), respectively. When a sheet of electromagnetic steel is punched out by the press, a pole piece portion at both ends of the teeth is rotated, by laminated iron core, in such a manner that the direction of displacement is changed at a central portion in a longitudinal direction when split cores so punched out are laminated.

When a large number of split cores shown in FIG. 8 are laminated to form a stator laminated iron core 400, as is shown in FIGS. 9(a) and 9(b), since pole pieces are displaced in one circumferential direction to a center laminated layer and are then displaced in an opposite direction downwards from the center laminated layer, cogging torque is made equal, and the winding work of windings can be made simple and easy. The productivity in punching out cores is increased.

Embodiment 5

Figure 10:
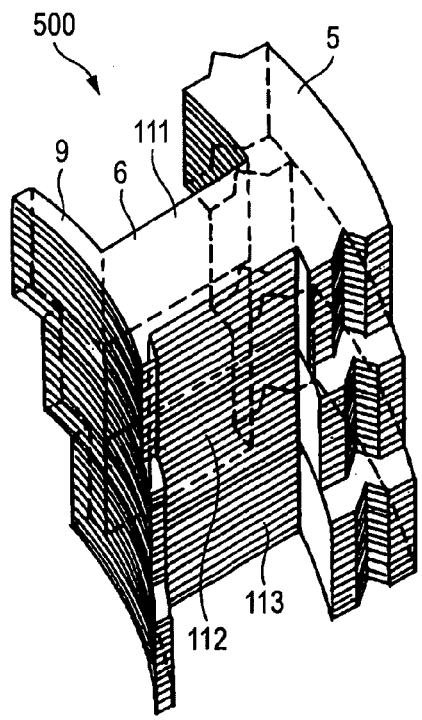
FIG. 10 is a perspective view showing a configuration formed by split cores of Embodiment 5 of the invention.
Figure 11:
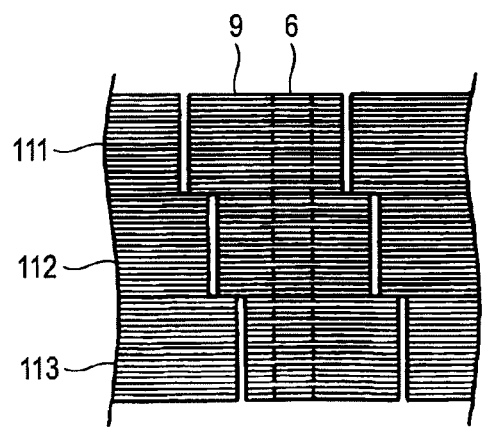
FIGS. 11(a) and 11(b) are sectioned side views of teeth and yokes when the split cores of Embodiment 5 are connected together.
Figure 11:
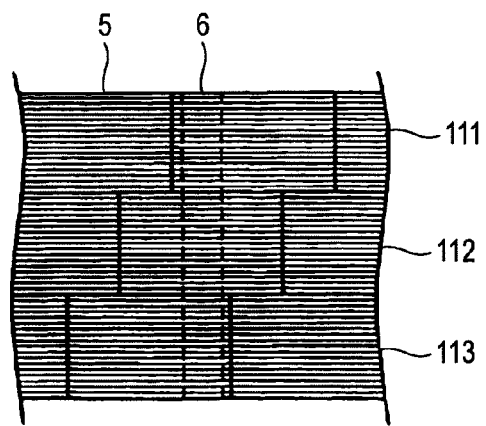

FIGS. 10 and 11 are diagrams which describe split cores according to Embodiment 5 of the invention, of which FIG. 10 is a perspective view and FIG. 11 shows sectioned side views of split cores of Embodiment 5 when they are connected together as viewed from the side of pole pieces (a) and the side of yokes (b), respectively. In this embodiment, a stator laminated iron core is divided into an upper block 111, a center block 112 and a lower block 113, and when a multiplicity of stator laminated iron core blocks like the respective stator laminated iron core blocks are laminated to form a stator laminated iron core 500, as is shown in FIGS. 11(a) and 11(b), a stepped skew is provided. By dividing the stator laminated iron core into blocks, the productivity is increased.

Since only both ends of yokes and pole pieces at both ends of the teeth are rotated, the teeth are not twisted, and hence, the winding work of windings can also be automated.

Embodiment 6

Figure 12:
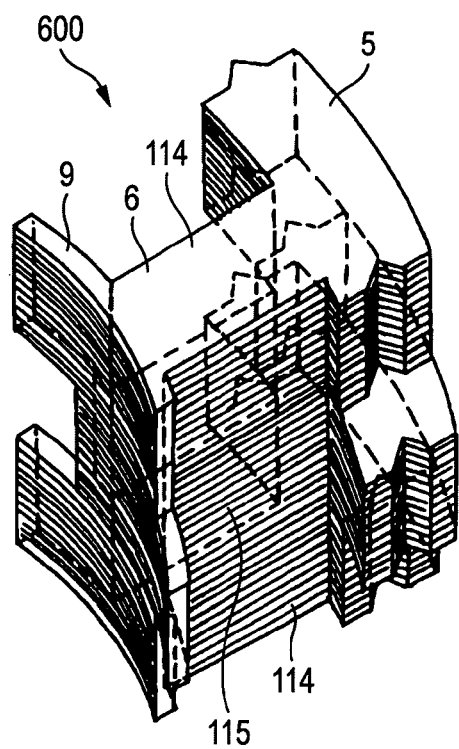
FIG. 12 is a perspective view showing a configuration formed by split cores of Embodiment 6 of the invention.
Figure 13:
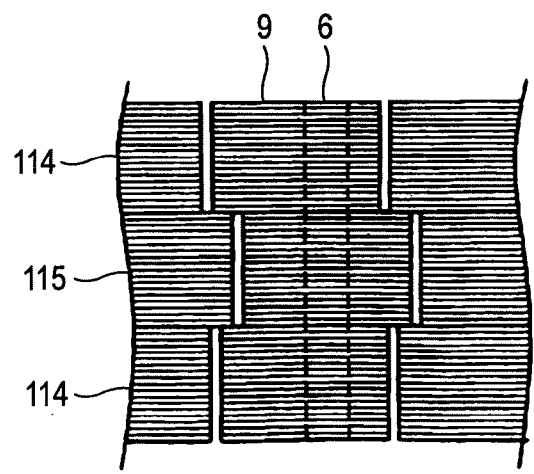
FIGS. 13(a) and 13(b) are sectioned side views of teeth and yokes when the split cores of Embodiment 6 are connected together.
Figure 13:
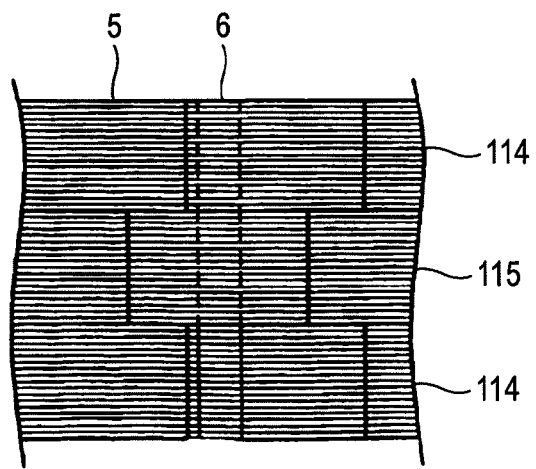

FIGS. 12 and 13 are diagrams which describe split cores according to Embodiment 6 of the invention, of which FIG. 12 is a perspective view and FIG. 13 shows sectioned side views of split cores of Embodiment 6 when they are connected together as viewed from the side of pole pieces (a) and the side of yokes (b), respectively. In this embodiment, when two types of blocks such as upper and lower blocks 114 and a center block 115 are combined together to form a stator laminated iron core 600, as is shown in FIGS. 13(a) and 13(b), the displacement amount at connecting portions is increased so as to increase rigidity. Since only both ends of yokes and pole pieces at distal ends of teeth are rotated, the teeth are not twisted, and hence, the winding work of windings can also be automated.

In the respective embodiments, the skew angle can be set as an angle which reduces a cogging torque fundamental wave component or an angle which reduces cogging torque attributed deteriorated accuracy.

Figure 14:
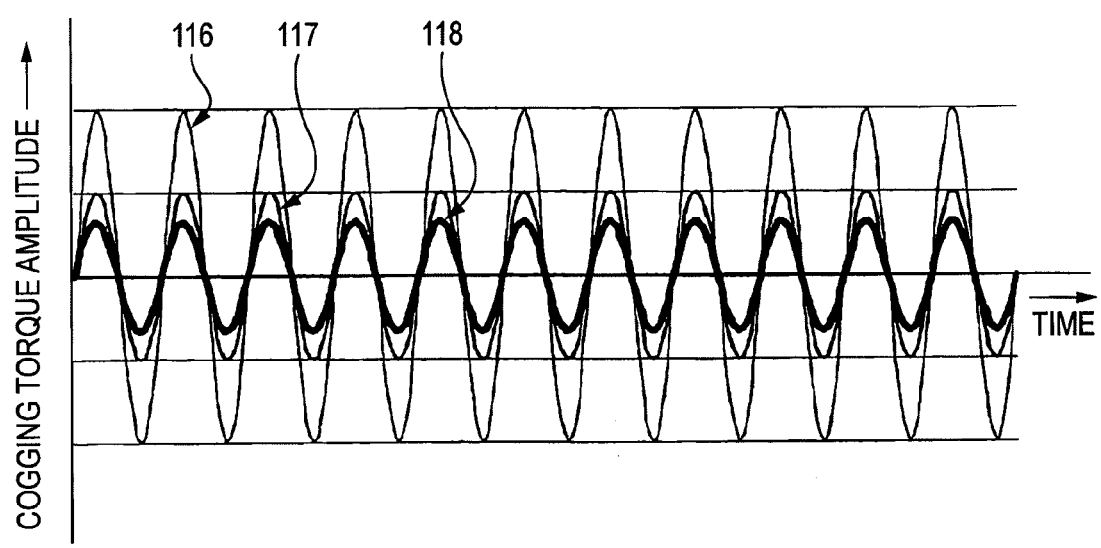
FIG. 14 is a cogging torque wave form chart illustrating advantages of the respective embodiments of the invention together with a conventional example.
Figure 20:
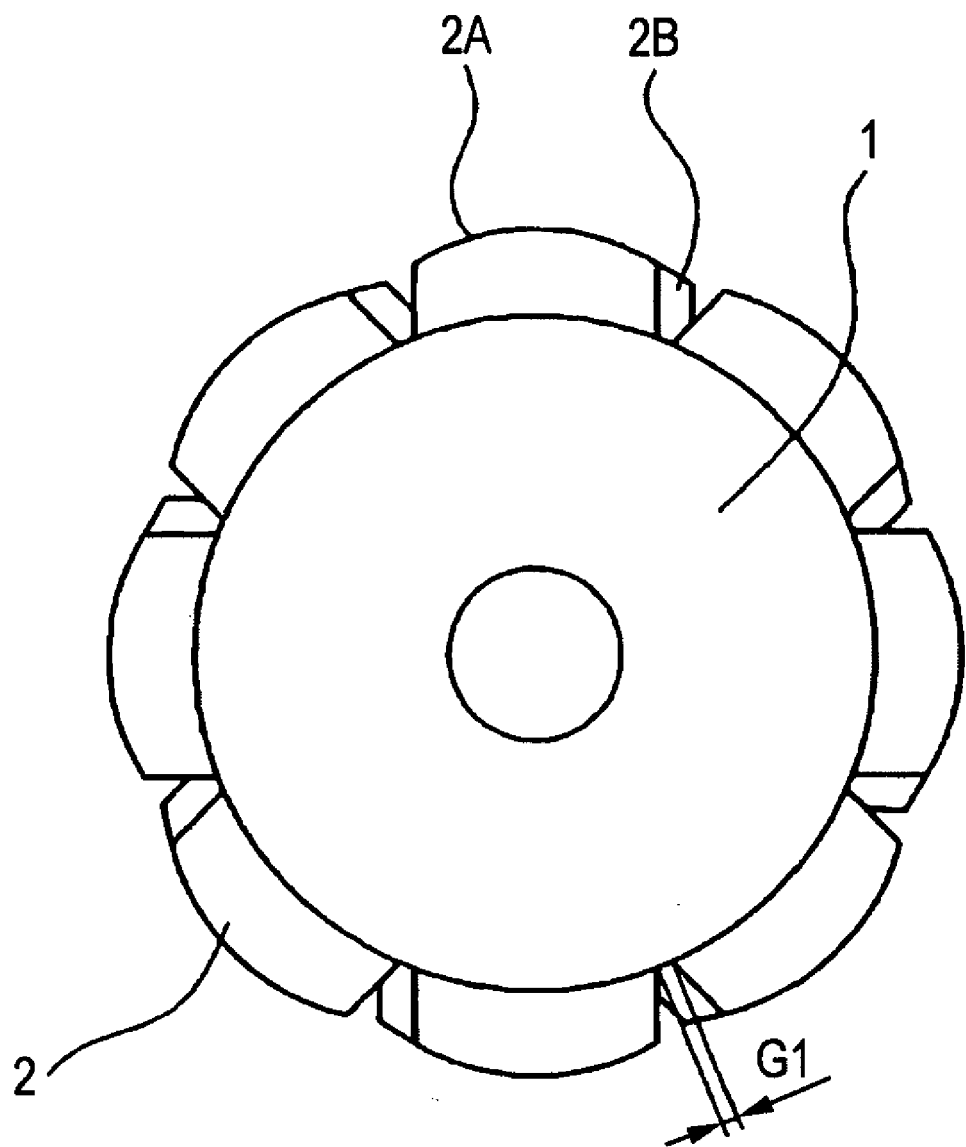
FIG. 20 is a front view of a rotor of a conventional motor.
Figure 21:
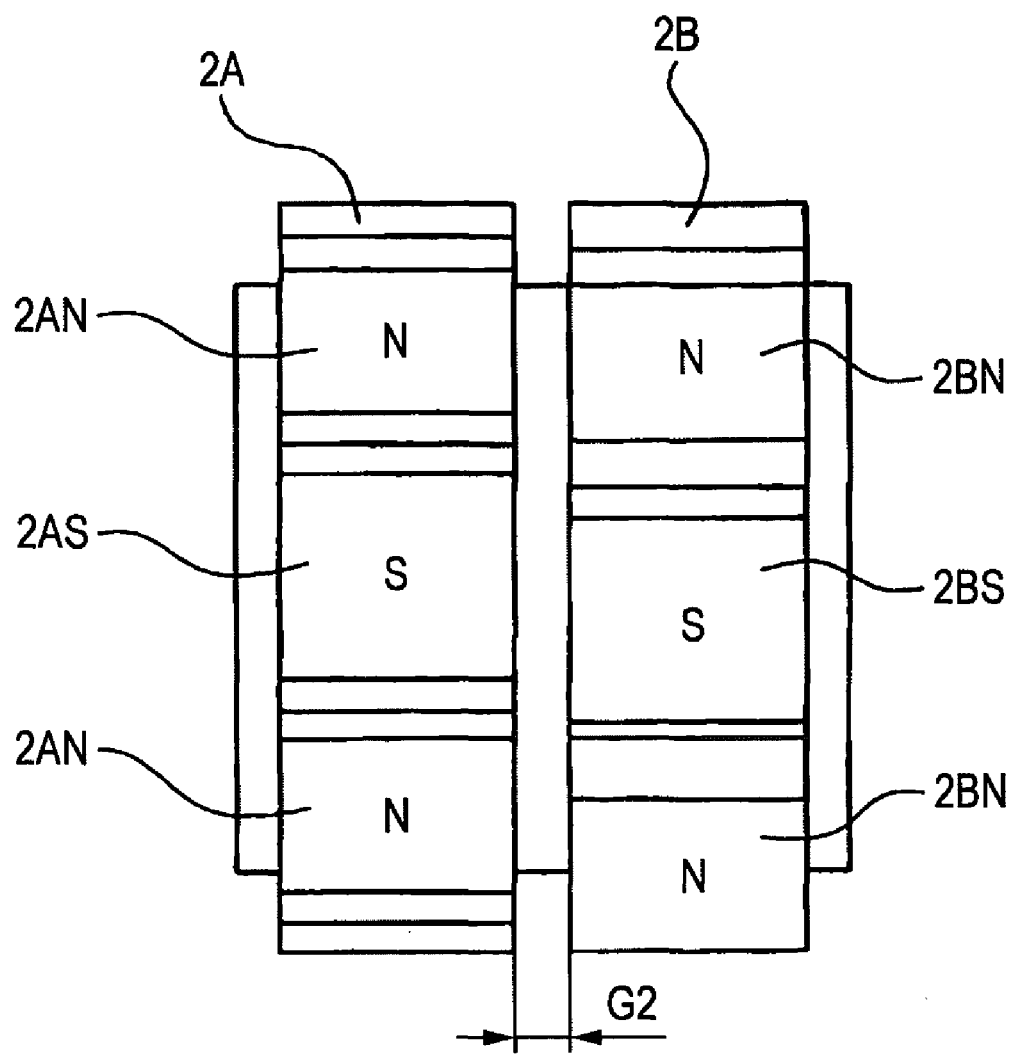
FIG. 21 is a side view of the rotor of the conventional motor.
Figure 22:
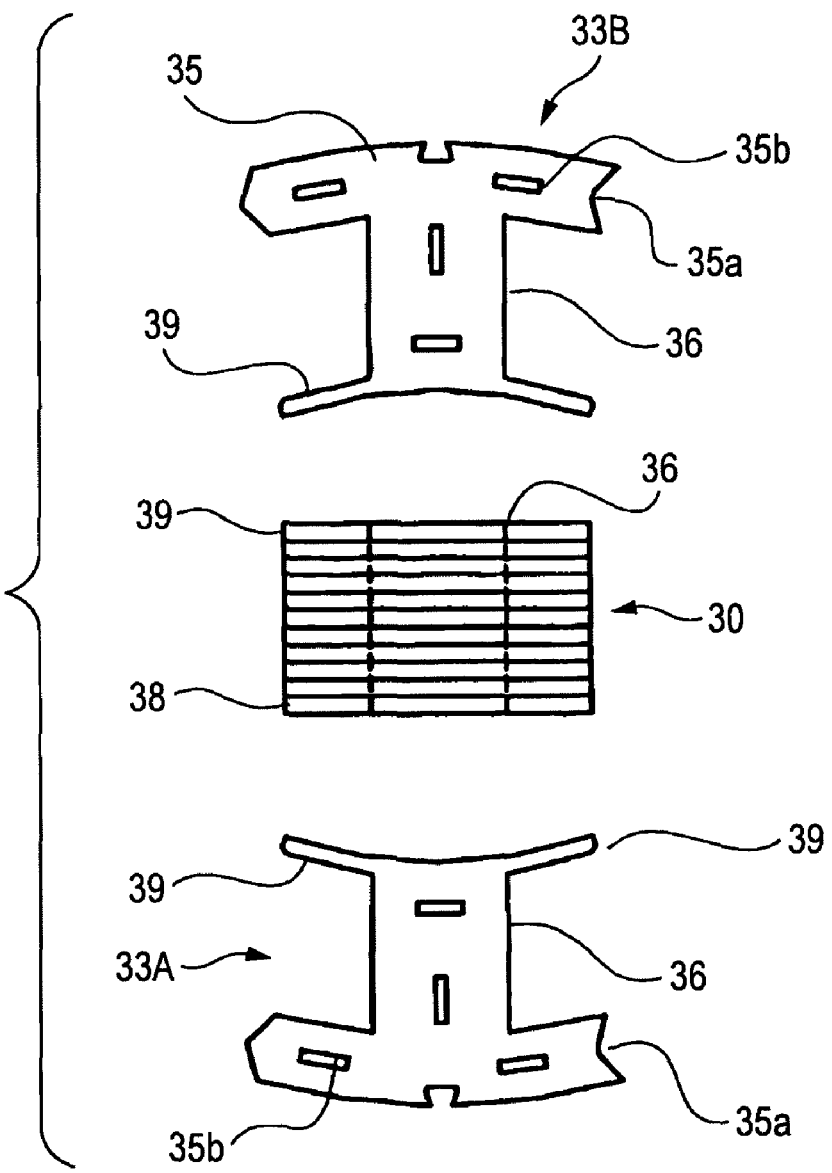
FIG. 22 is a diagram showing shapes of skew-less cores according to the related art.

FIG. 14 shows cogging torque wave forms which indicate the advantages of the respective embodiments of the first invention of the present patent application. In the figure, an axis of ordinates denotes the amplitude of cogging torque and an axis of abscissa denotes time. 116 denotes a cogging torque wave form of the conventional apparatus (FIG. 20), 117 denotes a cogging torque wave form of Embodiment 3 (FIG. 6), and 118 denotes a cogging torque wave form of Embodiment 2 (FIG. 4).

As is shown by Embodiment 3 having the cogging torque wave form 117, the cogging torque is made equal by displacing the pole pieces at both ends of the teeth in the circumferential direction and can be reduced to one half of the conventional cogging torque wave form 116.

Furthermore, as is shown by Embodiment 2 having the cogging torque wave form 118, by displacing the pole pieces at both ends of the teeth and the ends of the yokes in the circumferential direction, since the cogging torque is made equal and the rigidity is increased, the inside diameter out-of-roundness after a frame has been fitted in can be made equal to or less than 0.03 mm, and the cogging torque can be reduced to one third or less of the conventional cogging torque.

In addition, a high space factor can be realized in windings. The generation of vibration and noise is suppressed by reducing the cogging torque, whereby not only can a smooth rotation be realized but also the motor efficiency can be increased.

Thus, as has been described in Embodiments 1 to 6, according to the first invention of the present patent application, the cogging torque is reduced and high rigidity is realized by the construction of the stator core without displacing the blocks of the rotor of the synchronous motor in the circumferential direction and without twisting the slot cross sections.

Hereinafter, embodiments of a second invention of the present patent application will be described based on FIGS. 13 to 19.

Figure 15:
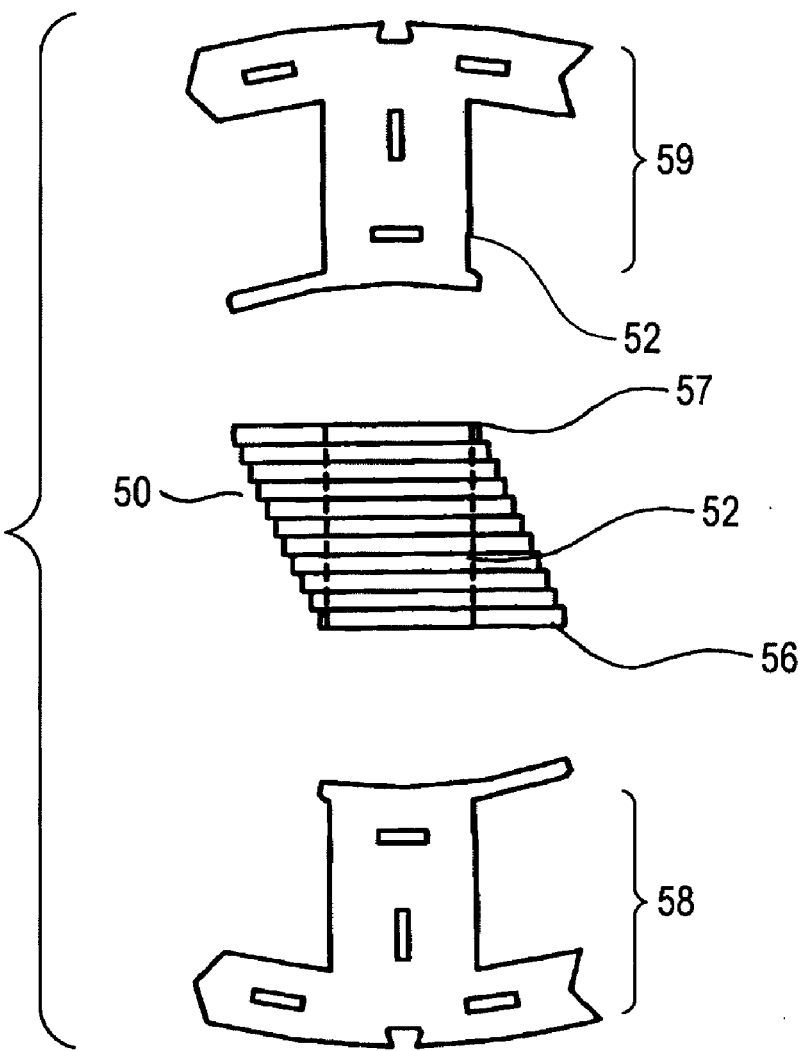
FIG. 15 is a diagram describing a continuous skew which is an embodiment of a second invention of the present patent application.

FIG. 15 shows an embodiment of the second invention of the present patent application, that is, shapes of an initial punched core and a final punched core and a stator core main body which is a laminated body of a multiplicity of cores.

In the figure, 58 denotes an initial punched core, a final punched core, and 52 a center yoke (a tooth). While center yoke portions 52 of an initial punched core 58 and a final punched core 59 where windings are applied are configured into a straight line, pole pieces at distal end portions of both the teeth for one stator core main body are changed from a shape on the initial punched core 58 to a shape on the final punched core 59 in the same shape.

The state of a cutting blade for forming this shape will be described in FIGS. 16 and 17.

Figure 16:
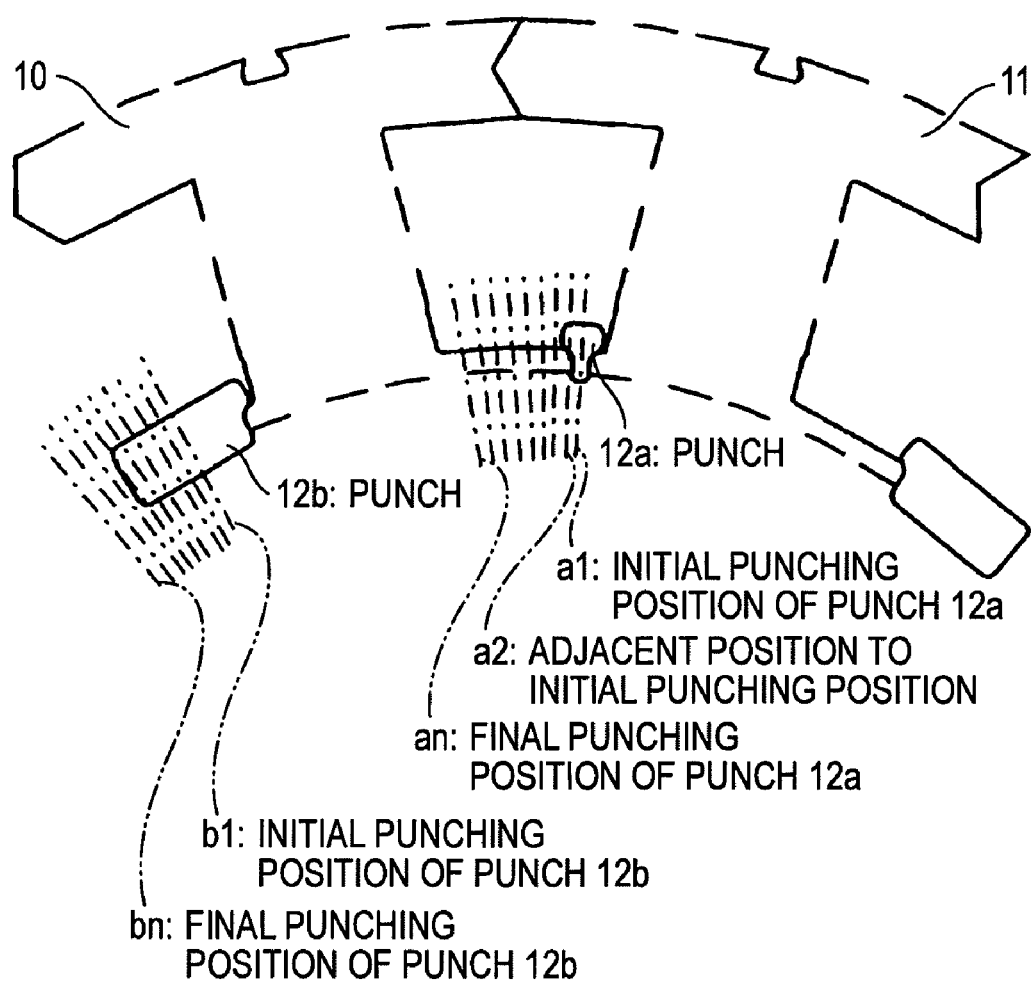
FIG. 16 is a plan view showing positions of punches and dies which form a distal end shape of an initial punched tooth.

FIG. 16 is a diagram showing positions of punches 12a, 12b and dies (openings having the same shapes of the punches) which form distal end shapes of initial punched cores, and 10 denotes a core A, 11 denoting a core B. Dotted lines indicate lines along which punching is planned to be carried out. The shapes of pole pieces at distal ends of teeth which are initially punched out are formed in such a manner that the lengths of the distal end portions of the core A and the core B become different by a punch 12a carrying out punching at a1 which is an initial punching position and a punch 12b carrying out punching at b1 which is an initial punching position.

From this state the punches 12a, 12b and the dies are shifted a constant distance from the position a1 to a2 and the position b1 to b2, respectively, as soon as the punching for one stroke is completed to punch out the next core.

This operation is performed repeatedly and finally, the punches 12a, 12b and the dies are shifted to positions an and bn, respectively, to punch out a final core.

Figure 17:
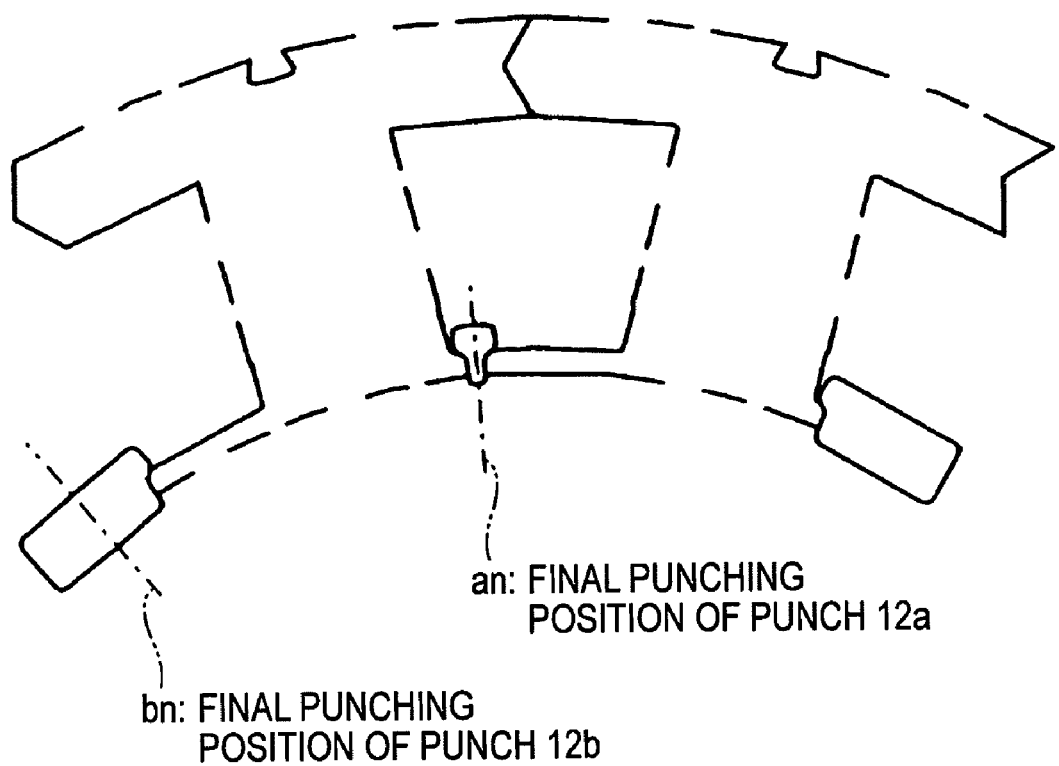
FIG. 17 is a plan view showing positions of the punches and the dies when a final punched tooth for one laminated core.

FIG. 17 shows positions of the punches 12a, 12b and the dies when final cores for one stator core main body have been punched out.

The lengths of distal end portions of both a core A and a core B which have been punched out as the final cores become opposite to the lengths of the distal end portions of the initial punched core A and core B shown in FIG. 16.

Consequently, a laminated state of cores for one stator core main body which are made up of a multiplicity of cores which have been punched out between the initial and final cores is shown in FIG. 15. As with a stator core main body 50 shown in FIG. 15, skews are formed at the distal ends of the teeth.

After this, the rotary cutting blade is returned to the starting position within time one cycle time of the press 1, so as to punch out cores for a second stator core main body and onward.

Figure 18:
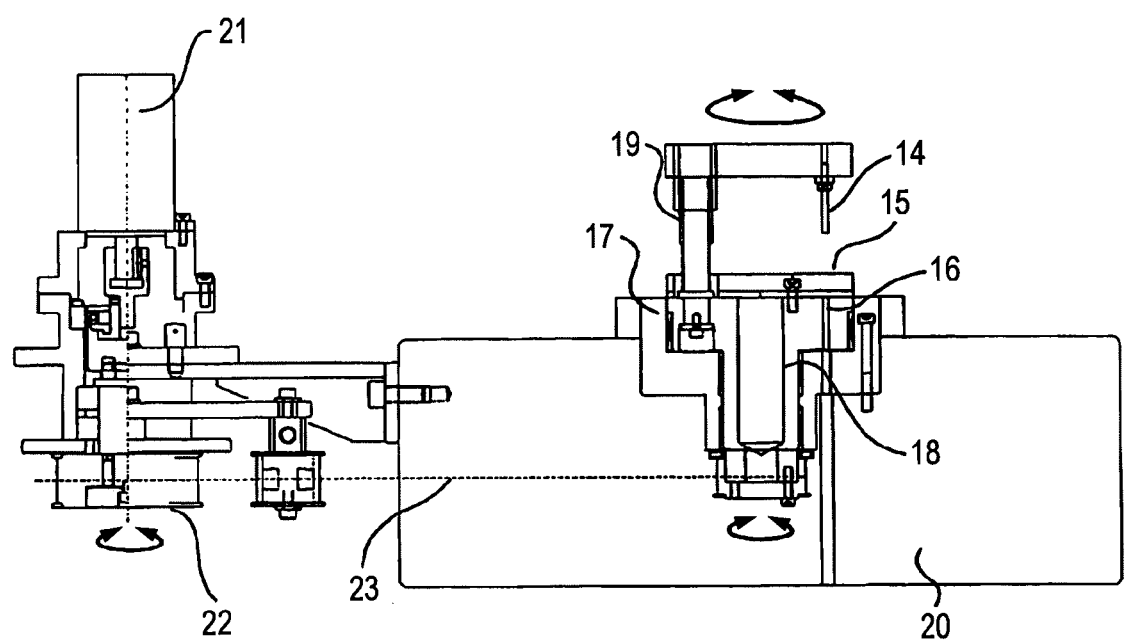
FIG. 18 is a plan view showing the construction of a drive unit for a rotary cutting blade.
Figure 19:
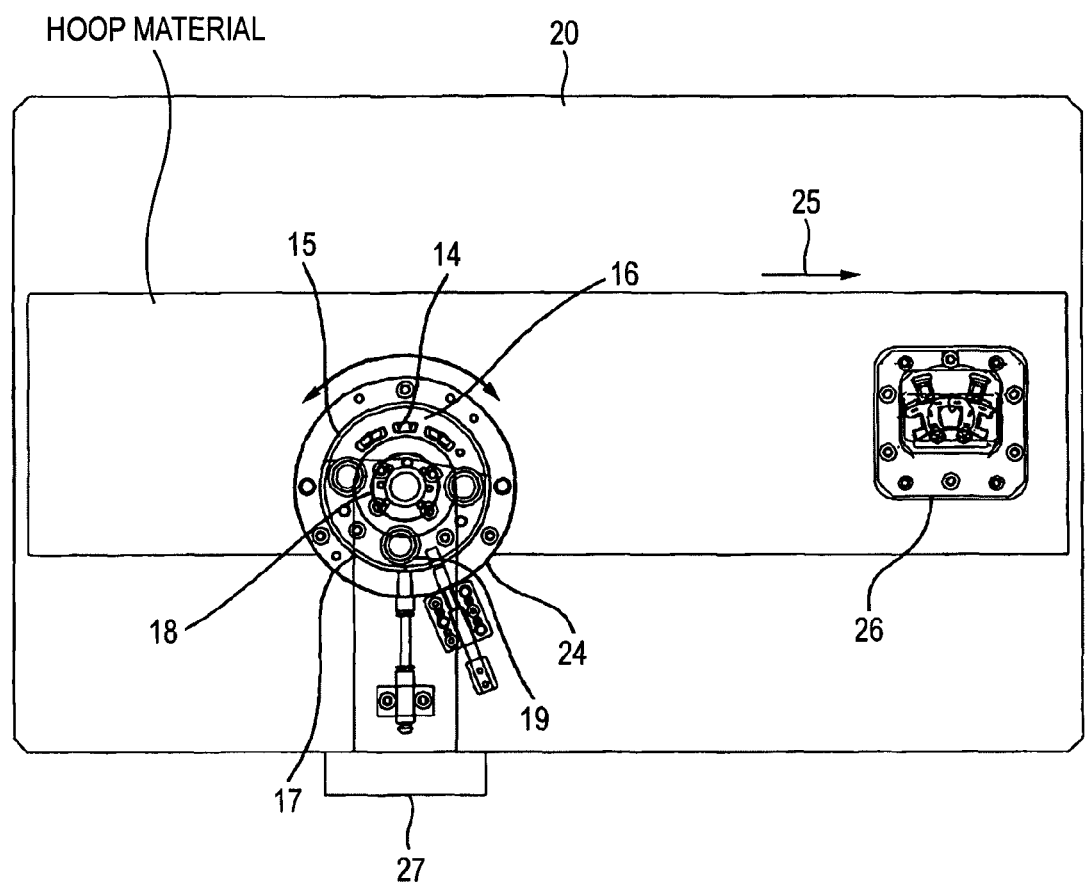
FIG. 19 is a plan view showing a state in which the rotary cutting blade is built in a progressive die.

FIG. 18 is a side view of a die used for the second invention of the present patent application in which an upper die and a lower die are combined together, which shows the construction of a drive unit of the rotary cutting blade, and FIG. 19 is a plan view resulting when FIG. 18 is seen from the top thereof, which shows a state in which the rotary cutting blade is built in a progressive die.

In both the figures, 12, 13 denote tooth cutting blades, 14 a punch (an upper die), 15 a stripper (a lower die), 16 a die (a lower die), 17 a die sleeve (a lower die), 18 a bearing, 19 a guide post (an upper die), 20 a die holder, 21 a motor, 22 a pulley, 23 a timing belt, and 24 a rotary cutting blade. The pulley 22 and the timing belt 23 rotate through rotation of the motor 21. The punch 14 and the die 16 are integrated via the guide post 19 and are constructed to rotate via the bearing 18.

A pulley is attached to a lower surface of the die sleeve 17 in such a manner as to rotate through rotation of the timing belt 23. In addition to these components, although not shown, there is a punch plate (an upper die) as a component which holds the punch and incorporates the punch. The bracketed words such as "upper die" and "lower die" are such as to indicate in which of the upper die and the lower die which make up the rotary die 24 the components given such bracketed words are situated.

The motor rotates in a constant amount per stroke by a signal of the press to thereby rotate the rotary cutting blade 24. A mechanism is adopted in which the length of a tooth portion is changed based on a relative positional relationship with a material (a hoop material). A hoop material, which is a material for cores, is inserted between the die 16 and the stripper 15 and is fed in a straight line in a material feeding direction indicated by an arrow 25 in FIG. 19.

The rotary cutting blade 24 is built in an intermediate process of the progressive die so as to change the length of teeth, Thus, as has been described heretofore, the second invention of the present patent application is characterized in that a continuous skew can simply be formed by building the rotary cutting blade 24 in the die and shifting the tooth cutting blades 12, 13 in the rotational direction.

Firstly, the rotary cutting blade (die set) 24 having a configuration in which the punches and the dies which determine the lengths of the distal end portions of the teeth of the core A10 and the core B11 rotate simultaneously is built in the progressive die and is caused to rotate by the motor connected from the outside while being shifted a predetermined amount per stroke of the press. When the shape of the distal end of the core is on the side of the core A, the distal end of the core A becomes short, while the core B becomes long.

Then, when punching for one stator core main body is completed, the cutting blade is returned to the original position (the starting position) within the stroke of the press 1.

Thus, as has been described heretofore, by changing the lengths of the tooth portions minutely by the rotary cutting blade which is built in the progressive die, a smoothly continuous skew can simply be formed, and hence this obviates the necessity of preparation of cutting blades for types of skews, which has been done in the related art. Consequently, the restriction on die size and increase in production costs are eliminated.

INDUSTRIAL APPLICABILITY

With the split cores for a motor stator core of the invention, since the cogging torque can be reduced by the construction of the stator core without displacing the blocks of the rotor of the permanent magnet type synchronous motor in the circumferential direction and without twisting the slot cross sections, the split cores can be applied to permanent magnet type synchronous motors for which smooth motions are required as in the field of FA such as machining tools.

The invention claimed is:

1. Split cores comprising:
    laminated iron cores each having formed thereon a tooth, and a yoke and a pole piece which are made to connect to the tooth at both ends thereof, and arranged and connected together into an annular shape to make up a stator, wherein both ends of the yokes and both ends of the pole pieces are displaced in one circumferential direction by laminated iron core from a top laminated layer of the iron cores of the split cores to a bottom laminated layer of the iron cores of the split cores.

2. The split cores as set forth in any one of claim 1,
wherein the tooth has a constant width in circumference, and is not displaced in one circumferential direction from the top laminated layer of the iron cores of the split cores to the bottom laminated layer of the iron cores of the split cores.

3. A motor stator comprising:
the split cores set forth in any one of claims 1 and 2, pairs of insulators which are mounted on the split cores from both sides thereof in the laminated direction, and armature coils mounted on the teeth of the split cores via the insulators,
wherein a plurality of split cores are arranged and connected with each other into an annular shape.

4. A permanent magnet type synchronous motor comprising:
a rotor disposed with a magnetic space interposed between the stator core set forth in claim 3 and itself and having a plurality of permanent magnets disposed on a surface thereof.

* * * * *